(12) United States Patent
Yu et al.

(10) Patent No.: US 7,964,282 B2
(45) Date of Patent: Jun. 21, 2011

(54) HOUSING WITH A SOFT SURFACE AND METHOD FOR MAKING THE HOUSING

(75) Inventors: Gang-Yang Yu, Shenzhen (CN);
Xue-Song Xiao, Shenzhen (CN);
Hsiang-Jung Su, Taipei Hsien (TW);
Wen-Te Lai, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 677 days.

(21) Appl. No.: 11/964,878

(22) Filed: Dec. 27, 2007

(65) Prior Publication Data
US 2009/0123761 A1 May 14, 2009

(30) Foreign Application Priority Data
Nov. 9, 2007 (CN) .......................... 2007 1 0202434

(51) Int. Cl.
*B32B 27/06* (2006.01)
*B05D 5/10* (2006.01)

(52) U.S. Cl. ..................................... 428/423.3; 204/484
(58) Field of Classification Search ............... 428/423.3; 204/484
See application file for complete search history.

(56) References Cited

U.S. PATENT DOCUMENTS
5,574,102 A * 11/1996 Tanigami et al. ............. 525/124

FOREIGN PATENT DOCUMENTS
CN 1803953 A 7/2006
* cited by examiner

*Primary Examiner* — Thao T. Tran
(74) *Attorney, Agent, or Firm* — Jeffrey T. Knapp

(57) ABSTRACT

A durable housing with a soft surface device (100) includes a substrate (10), an electrophoresis coating (20) formed on a surface of the substrate, an intermediate coating (30) formed on the electrophoresis coating, and a top coating (40) formed on the intermediate coating and configured for protecting the intermediate coating. The electrophoresis coating is made of a first resin paint. The intermediate coating is made of a second resin paint containing an isocyanate polymer and/or reaction products of the isocyanate polymer with hydroxyl groups. The top coating is made of a third resin paint an isocyanate polymer cross-linked to the second resin paint of the intermediate coating.

18 Claims, 1 Drawing Sheet

HOUSING WITH A SOFT SURFACE AND METHOD FOR MAKING THE HOUSING

CROSS-REFERENCE TO RELATED APPLICATIONS

This application is related to co-pending U.S. patent application Ser. No. 11/961,283, entitled "HOUSING WITH A SOFT SURFACE", by Gang-Yang Yu et al. Such application has the same assignee as the present application and has been filed on Dec. 20, 2007. The above-identified application is incorporated herein by reference.

BACKGROUND OF THE INVENTION

1. Field of the Invention

The present invention relates to housings, particularly to a housing with a soft surface and a method for making the housing.

2. Description of Related Art

Mobile devices, such as mobile telephones, personal digital assistants, or MP3 players, enable consumers to enjoy the convenience of high technology services, almost anytime and at virtually any location. These mobile devices often employ any of a variety of decorative housings to attract consumers. Paint and ink are typically applied onto surfaces of the housings to provide necessary decorative appearance. Nowadays, housings, attractive not only to the idea, but also attractive to the touch, such as soft housings, are highly desirable. In a typical process for the production of the soft housing, a soft material is employed to cover the housing, so as to form a soft layer on the housing. The soft material used in such processes is typically flexible resin.

However, the typical flexible resin applied onto the housings has a poor adhesion to a metal substrate (e.g., an aluminum substrate or a steel substrate) and liable to be worn out. For improving the adhesion of the flexible resin to the metal substrate, an electrophoresis coating is employed onto the metal substrate, and the flexible resin is then applied onto the electrophoresis coating. However, the electrophoresis coating is typically coarse, which degenerates appearance of the housings made by such above-mentioned means.

Therefore, a housing with a soft surface is desired in order to overcome the above-described shortcomings.

SUMMARY OF THE INVENTION

In one aspect thereof, a housing is provided. The housing includes a substrate, a electrophoresis coating formed on a surface of the substrate, an intermediate coating formed on the electrophoresis coating, and a top coating formed on the intermediate coating and configured for protecting the intermediate coating. The electrophoresis coating is made of a first resin paint containing a polyamide component. The intermediate coating is made of a second resin paint. The top coating is made of a third resin paint. Both the second resin paint and the third resin paint contain an isocyanate polymer and/or reaction products of the isocyanate polymer with hydroxyl groups.

In another aspect thereof, a method for making a housing is provided. The method includes following steps. Firstly, a substrate is provided. Secondly, the substrate is electro-coated with a first resin paint via an electrophoresis process to form an electrophoresis coating. Thirdly, an intermediate coating is applied onto the electrophoresis coating. The intermediate coating is made of a second resin paint containing an isocyanate polymer and/or reaction products of the isocyanate polymer with hydroxyl groups. Finally, a top coating is applied onto the intermediate coating. The top coating is made of a third resin paint containing an isocyanate polymer component cross-linked to the second resin paint of the intermediate coating.

Other advantages and novel features will become more apparent from the following detailed description of preferred embodiments when taken in conjunction with the accompanying drawings.

BRIEF DESCRIPTION OF THE DRAWINGS

Many aspects of the housing with a soft surface can be better understood with reference to the following drawing. The components in the drawing are not necessarily drawn to scale, the emphasis instead being placed upon clearly illustrating the principles of the housing with a soft surface. Moreover, in the drawing like reference numerals designate corresponding parts throughout the several views.

DETAILED DESCRIPTION OF THE INVENTION

Figure 1:
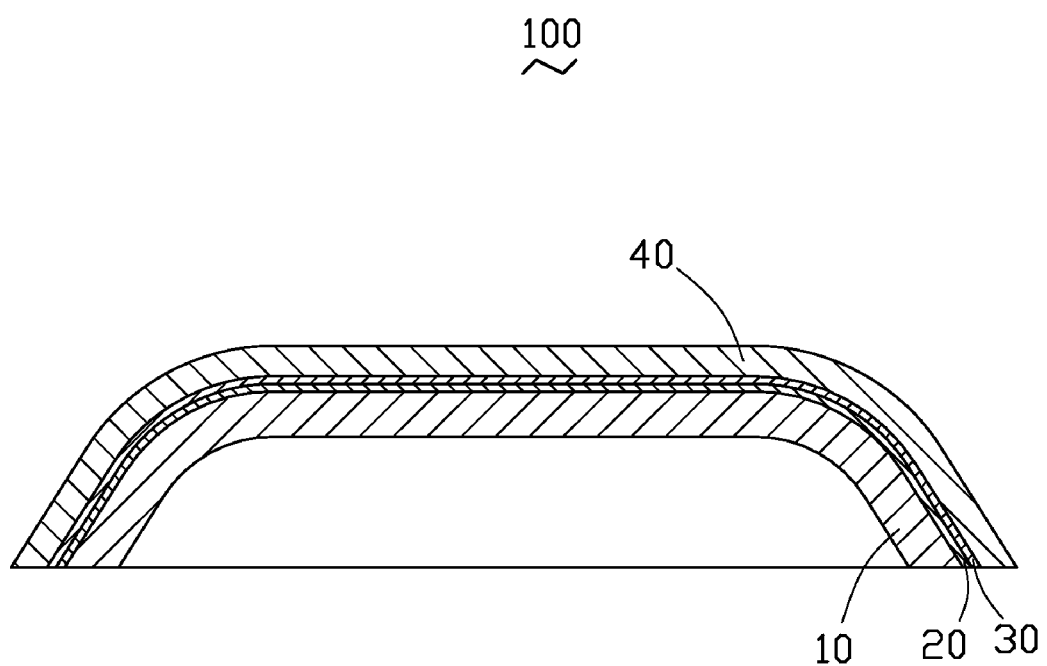
FIG. 1 is a cross-sectional view of a present embodiment of a housing with a soft surface.

Referring to FIG. 1, in a present embodiment, a housing 100 includes a substrate 10, an electrophoresis coating 20 formed on one surface of the substrate 10, an intermediate coating 30 formed on the electrophoresis coating 20, and a top coating 40 formed on the intermediate coating 30 and configured for protecting the intermediate coating 30, i.e., the intermediate coating 30 is sandwiched between the electrophoresis coating 20 and the top coating 40.

The substrate 10 is made of metal selected from the group consisting of aluminum, magnesium, steel, and any alloy thereof.

The electrophoresis coating 20 may be made of a first resin paint. The first resin paint should preferably include an acrylic resin component as major constituent (e.g., more than 10% by weight). For example, the first resin paint includes the acrylic resin component in an approximate portion of 40 wt % to 60 wt %, isopropyl alcohol in an approximate portion of 13 wt % to 18 wt %, and glycol/methyl butyl alcohol in an approximate portion of 3.5 wt % to 5.5 wt %. The electrophoresis coating 20 is formed via an electrophoresis process by applying the first resin paint on to the substrate 10. Understandably, the first resin paint can further include a desired dye component. The thickness of the electrophoresis coating 20 is in an approximate range from 8 μm to 12 μm.

The intermediate coating 30 is made of a second resin paint, which includes an isocyanate polymer and/or reaction products of the isocyanate polymer with hydroxyl groups as major constituent. The second resin paint is a first mixture of a first major agent and a first hardener. The intermediate coating 30 may be formed via a spraying process to apply the first mixture onto the electrophoresis coating 20 and a heating process to cure the mixture. The thickness of the intermediate coating 30 is in an approximate range from 10 μm to 15 μm.

The first major agent includes toluene in an approximate portion of 75 wt % to 85 wt %, 1-Methoxy-2-propyl acetate in an approximate portion of 1 wt % to 5 wt %, and ethyl benzene in an approximate portion less than 1 wt %.

The first hardener includes at least one isocyanate polymer, which should preferably be polyhexamethylene diisocyanate. The first hardener, for example, includes the polyhexamethylene diisocyanate in an approximate portion of 65 wt % to 75 wt %, xylene in an approximate portion of 5 wt % to 15 wt %, and ethyl benzene less than 1 wt %.

The weight ratio of the first major agent to the first hardener is 90 to 110:3 to 7, and should preferably be 100:5. The isocyanate polymer of the first hardener and/or reaction products of the isocyanate polymer with hydroxyl function groups contained in the first major agent are partially cross-linked to the acrylic resin component contained in the electrophoresis coating 20, thereby improving the adhesion of the intermediate coating 30 to the electrophoresis coating 20.

The top coating 40 is made of a third resin paint, which includes an isocyanate polymer and/or reaction products of the isocyanate polymer with hydroxyl groups as major constituent. The third resin paint is a second mixture of a second major agent, a second hardener, and a second thinner. The top coating 40 may be formed via a spraying process to apply the second mixture onto intermediate coating 30 and a heating process to cure the mixture. The thickness of the intermediate coating 30 is in an approximate range from 40 μm to 60 μm.

The second major agent can be a mixture of butyl acetate, xylene, ethyl benzene, and dibutyl tin dilaurate. Understandably, other additives such as polymeric photo-stabilizing agents can be employed into the second major agent to give a surface luster to the top coating 40.

The second hardener includes at least an isocyanate polymer, which should preferably be polyhexamethylene diisocyanate. The second hardener, for example, includes the polyhexamethylene diisocyanate in an approximate portion of 65 wt % to 75 wt %, butyl acetate in an approximate portion of 5 wt % to 15 wt %, aromatic solvent in an approximate portion of 5 wt % to 15 wt %, 1,2,4-trimethylbenzene in an approximate portion of 1 wt % to 5 wt %, and isopropyl benzene less than 1 wt %.

The second thinner includes ethyl acetate in an approximate portion of 45 wt % to 55 wt % and toluene in an approximate portion of 45 wt % to 55 wt %.

The weight ratio of the second major agent, the second hardener, to the second thinner may be 90 to 110:15 to 30:15 to 60 and preferably be 100:22: 20 to 50. The dibutyl tin dilaurate contained in the second major agent may function as a catalyst for speeding up a chemical reaction between isocyanate polymers and hydroxyl function groups, which may be contained in the second major agent at a temperature less than 80° C. The dibutyl tin dilaurate can also be tertiary amines or other suitable organometallic catalysts.

The isocyanate polymer and/or the reaction products thereof contained in the top coating 40 may be partially cross-linked to the isocyanate polymer and/or the reaction products thereof contained in the decorative coating 30, thereby improving the adhesion of the top coating 40 to the intermediate coating 30.

A method for making the housing 100 is provided. In a first step of the method for making the housing 100, a process for degreasing a substrate made of metal selected from the group consisting of aluminum, magnesium, steel, and any alloy thereof. The degreasing process is carried out using, advantageously, an alkali-based degreasing agent, in order to smoothen and clean the surface of the substrate 10. After being degreased, the substrate 10 is subsequently rinsed in flowing water. It is to be understood that, additionally or alternatively, other degreasing agents, such as surfactants, could be employed in the first step of the method.

In a second step of the method, the substrate 10 is placed into an anode electrolyzer containing a sodium hydroxide solution at a concentration in an approximate range from 60 g/l (gram per liter) to 80 g/l. The substrate 10 is electrolyzed for 40 to 80 seconds as an anode in the anode electrolyzer. After being electrolyzed, the substrate 10 is subsequently rinsed in flowing water.

In a third step of the method, the substrate 10 is then placed into a cathode electrolyzer containing a sodium hydroxide solution at a concentration in an approximate range from 60 g/l to 80 g/l. The substrate 10 is electrolyzed for 40 to 80 seconds as an cathode in the cathode electrolyzer. After being electrolyzed, the substrate 10 is subsequently rinsed in flowing water.

In a fourth step of the method, the substrate 10 is dipped into a sulfuric acid solution at a concentration in an approximate range from 20 g/l to 40 g/l for 50 seconds to 100 seconds, so as to neutralize sodium hydroxide remained on the substrate 10. After being neutralized, the substrate 10 is subsequently rinsed in flowing water and/or in water with ultrasonic vibrations.

In a fifth step of the method, the substrate 10 is electrocoated with the first resin paint via an electrophoresis process. During the electrophoresis process, the substrate 10 is dipped into an electro-coat solution containing the first resin paint at a temperature of 23° C. to 27° C. for 50 seconds to 100 seconds. The substrate 10 functions as an electrode. A voltage applied between the substrate 10 and one or more counter electrodes dipped in the electro-coat solution may be in an approximate range from 50 volts to 90 volts. The first resin paint particles contained in the electro-coat solution may be charged and deposited onto the substrate 10 under influence of an electric field generated between the substrate 10 and the anti-electrode. The first resin paint should preferably include at least one acrylic resin component as major constituent (e.g., more than 10% by weight). For example, the first resin paint includes the acrylic resin component in an approximate portion of 40 wt % to 60 wt %, isopropyl alcohol in an approximate portion of 13 wt % to 18 wt %, and glycol/methyl butyl alcohol in an approximate portion of 3.5 wt % to 5.5 wt %.

In a sixth step of the method, the substrate 10 is rinsed in water and then dried in an oven.

In a seventh step of the method, the substrate 10 is coated with the intermediate coating 30 via a first spraying process. During the first spraying process, the second resin paint is atomized and sprayed onto the electrophoresis coating 20 to form the intermediate coating 30 with a thickness in an approximate range from 10 μm to 15 μm. The atomization pressure applied onto the second resin paint is in an approximate range from 0.1 to 0.16 million Pa. After the first spraying process, the electrophoresis coating 20 is leveled and cured at a temperature in an approximate range from 70° C. to 100° C., beneficially, from 75° C. to 85° C.

In an eighth step of the method, the third resin paint is applied onto the intermediate coating 30 via a second spraying process to form the top coating 40. During the second spraying process, the third resin paint is atomized and sprayed onto the intermediate coating 30 to form the top coating 40 with a thickness in an approximate range from 40 μm to 60 μm. The atomization pressure applied onto the third resin paint is in an approximate range from 0.07 to 0.13 million Pa. After the second spraying process, the top coating 40 is leveled and cured at a temperature in an approximate range from 70° C. to 105° C., beneficially, from 80° C. to 95° C. As such, the housing 100 is obtained.

The housing 100 prepared via the above method has a smooth, fine, and lustrous surface. The housing 100 has undergone the following tests. In a first test, the housing 100 is tested for thermal shock resistance. The test is carried out by twenty-seven thermal shock cycles onto the housing 100. Each thermal shock cycle is performed by placing the housing 100 into a first chamber at a temperature of −40° C. for several minutes, then rapidly transferring the housing 100 into a second chamber at a temperature of 85° C. to heat the housing 100 for more than one minute, and finally placing the housing back into the first chamber at the temperature of −40° C. In such test, no cracking, blistering, or peeling of the electrophoresis coating 20, the intermediate coating 30, and the top coating 40 of the housing 100 is observed.

In a second test, the housing 100 is tested for high temperature resistance and high humidity resistance by placing the housing into a third chamber at a temperature of 60° C. and at a humidity of 90% RH for 48 hours. No cracking, blistering, or peeling of the electrophoresis coating 20, the intermediate coating 30, and the top coating 40 of the housing 100 is observed.

In a third test, the housing 100 is coated with suntan oil and then placed into the third chamber at a temperature of 60° C. and at a humidity of 90% RH for 48 hours. In such test, no cracking, blistering, or peeling of the electrophoresis coating 20, the intermediate coating 30, and the top coating 40 of the housing 100 is observed.

In a fourth test, the housing 100, which had been tested in the first test, the second test, and the third test, is tested for coating adhesion by using a cross-cut tester to score the surface of the housing 100. The test result shows that the electrophoresis coating 20, the intermediate coating 30, and the top coating 40 of the housing 100 has a coating adhesion of 5B.

In a fifth test, the housing 100, which had been tested in the first test, the second test, and the third test, is tested for coating hardness by method of a pencil test using a pencil tester to score the surface of the housing 100 at an angle of 45° and under 500 gf (gram-force). The test result shows that the coating hardness of the coatings including the electrophoresis coating 20, the intermediate coating 30, and the top coating 40, is HB in the pencil test.

In a sixth test, the housing 100 is tested for solvent resistance by immersing the housing into an organic solvent, e.g. butanone, for 2 minutes. In such test, no change of the surface of the housing 100 is observed.

From the above tests, the coatings of the housing 100 including the electrophoresis coating 20, the intermediate coating 30, and the top coating 40 are shown to have improved adhesion under high moisture and high temperature, high thermal shock resistance, high hardness, and high chemical solvent resistance.

It should be also understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing with a soft surface, comprising:
   a substrate;
   an electrophoresis coating formed on a surface of the substrate, the electrophoresis coating being made of a first resin paint;
   an intermediate coating formed on the electrophoresis coating, the intermediate coating being made of a second resin paint containing polyhexamethylene diisocyanate; and
   a top coating formed on the intermediate coating, the top coating being made of a third resin paint containing an isocyanate polymer component cross-linked to the second resin paint of the intermediate coating.

2. The housing as claimed in claim 1, wherein the substrate is made of metal selected from the group consisting of aluminum, magnesium, steel, and any alloy thereof.

3. The housing as claimed in claim 1, wherein the first resin paint includes an acrylic resin component.

4. The housing as claimed in claim 3, wherein the first resin paint includes the acrylic resin component in an approximate portion of 40 wt % to 60 wt %.

5. The housing as claimed in claim 1, wherein the electrophoresis coating has a thickness in an approximate range from 8 μm to 12 μm.

6. The housing as claimed in claim 1, wherein the second resin paint is a first mixture of a first major agent including solvents and at least one hydroxyl component and a first hardener including the polyhexamethylene diisocyanate component.

7. The housing as claimed in claim 6, wherein the first major agent includes toluene in an approximate portion of 75 wt % to 85 wt %, 1-Methoxy-2-propyl acetate in an approximate portion of 1 wt % to 5 wt %, and ethyl benzene in an approximate portion less than 1 wt %.

8. The housing as claimed in claim 6, wherein the first hardener includes the polyhexamethylene diisocyanate in an approximate portion of 65 wt % to 75 wt %, xylene in an approximate portion of 5 wt % to 15 wt %, and ethyl benzene less than 1 wt %.

9. The housing as claimed in claim 1, wherein the intermediate coating has a thickness in an approximate range from 10 μm to 15 μm.

10. The housing as claimed in claim 1, wherein the third resin paint is a second mixture of a second major agent including at least one hydroxyl component, a second hardener including the isocyanate polymer, and a second thinner including solvents.

11. The housing as claimed in claim 10, wherein the second major agent is a mixture of butyl acetate, xylene, ethyl benzene, and dibutyl tin dilaurate.

12. The housing as claimed in claim 10, wherein the isocyanate polymer is polyhexamethylene diisocyanate.

13. The housing as claimed in claim 12, wherein the polyhexamethylene diisocyanate component in an approximate portion of 65 wt % to 75 wt % of the second hardener, the second hardener further including butyl acetate in an approximate portion of 5 wt % to 15 wt %, aromatic solvent in an approximate portion of 5 wt % to 15 wt %, 1,2,4-trimethylbenzene in an approximate portion of 1 wt % to 5 wt %, and isopropyl benzene less than 1 wt %.

14. The housing as claimed in claim 10, wherein the second thinner includes ethyl acetate in an approximate portion of 45 wt % to 55 wt % and toluene in an approximate portion of 45 wt % to 55 wt %.

15. A method for making a housing, comprising the steps of:
   providing a substrate;
   electro-coating the substrate with a first resin paint via an electrophoresis process to form an electrophoresis coating;
   applying an intermediate coating onto the electrophoresis coating, the intermediate coating being made of a second resin paint containing polyhexamethylene diisocyanate; and
   applying a top coating onto the intermediate coating, the top coating being made of a third resin paint containing an isocyanate polymer component cross-linked to the second resin paint of the intermediate coating.

16. The method as claimed in claim 15, wherein the substrate is made of metal selected from the group consisting of aluminum, magnesium, steel, and any alloy thereof.

17. The method as claimed in claim 15, wherein the isocyanate polymer is polyhexamethylene diisocyanate.

18. The method as claimed in claim 15, wherein the first resin paint includes an acrylic resin component.

* * * * *